(12) United States Patent
Sasazaki

(10) Patent No.: US 8,423,834 B2
(45) Date of Patent: Apr. 16, 2013

(54) COMPUTER SYSTEM AND MEMORY SYSTEM

(75) Inventor: Isao Sasazaki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 548 days.

(21) Appl. No.: 12/036,634

(22) Filed: Feb. 25, 2008

(65) Prior Publication Data
US 2008/0209277 A1    Aug. 28, 2008

(30) Foreign Application Priority Data

Feb. 28, 2007    (JP) ................................. 2007-049458

(51) Int. Cl.
*G06F 11/00* (2006.01)
(52) U.S. Cl.
USPC ............................................................ 714/48
(58) Field of Classification Search ...................... 714/48
See application file for complete search history.

(56) References Cited

U.S. PATENT DOCUMENTS

| | | | | |
|---|---|---|---|---|
| 5,274,825 | A * | 12/1993 | Lemay et al. ................ | 710/268 |
| 2004/0199825 | A1* | 10/2004 | Zeller et al. ................. | 714/36 |
| 2004/0210748 | A1* | 10/2004 | Liang ........................... | 712/229 |
| 2005/0086277 | A1* | 4/2005 | Miyamori .................... | 708/233 |
| 2005/0204193 | A1* | 9/2005 | Mannava et al. ............. | 714/18 |
| 2005/0268208 | A1* | 12/2005 | Shimizume et al. ......... | 714/763 |
| 2006/0026299 | A1* | 2/2006 | Gostin et al. ................ | 709/245 |
| 2006/0282755 | A1* | 12/2006 | Oh .............................. | 714/801 |
| 2007/0150673 | A1* | 6/2007 | Rajaram ...................... | 711/154 |

FOREIGN PATENT DOCUMENTS

| | | |
|---|---|---|
| JP | 01-100636 | 4/1989 |
| JP | 3-11430 | 1/1991 |
| JP | 03-098129 | 4/1991 |
| JP | 3-209523 | 9/1991 |
| JP | 04-290130 | 10/1992 |
| JP | 5-189231 | 7/1993 |

OTHER PUBLICATIONS

Intel Japan K.K., "iAPX 86 Family User's Manual", CQ Publishing Co., Ltd., May 20, 1982, Third Edition, pp. 410-412 (5 pages).
Japanese Office Action issued Sep. 6, 2011 in related Japanese Patent Application No. 2007-049458 (4 pages) (2 pages English translation).
Japanese Office Action for Application No. 2007-049458 issued Jun. 12, 2012.
Motorola Japan Ltd., "MC68000 16-bit microprocessor: user's manual", CQ Publishing Co Ltd., Jul. 15, 1982, vol. 4, pp. 70-73.

* cited by examiner

*Primary Examiner* — Scott Baderman
*Assistant Examiner* — Jigar Patel
(74) *Attorney, Agent, or Firm* — Staas & Halsey LLP

(57) ABSTRACT

A computer system includes a CPU, a memory circuit storing at least instruction codes, an error checking circuit checking an error of an instruction code read from the memory circuit according to an instruction address supplied from the CPU, a code storing circuit storing data to be outputted to the CPU instead of data from the memory when an error occurs, a selection circuit in which inputs are coupled to the memory circuit and the code storing circuit, and selectively outputting data from the code storing circuit when an error is detected by the error checking circuit, a bus connecting the selection circuit to the CPU, and an instruction error register storing a value indicating that an error occurs when the error is detected by the error checking circuit.

11 Claims, 8 Drawing Sheets

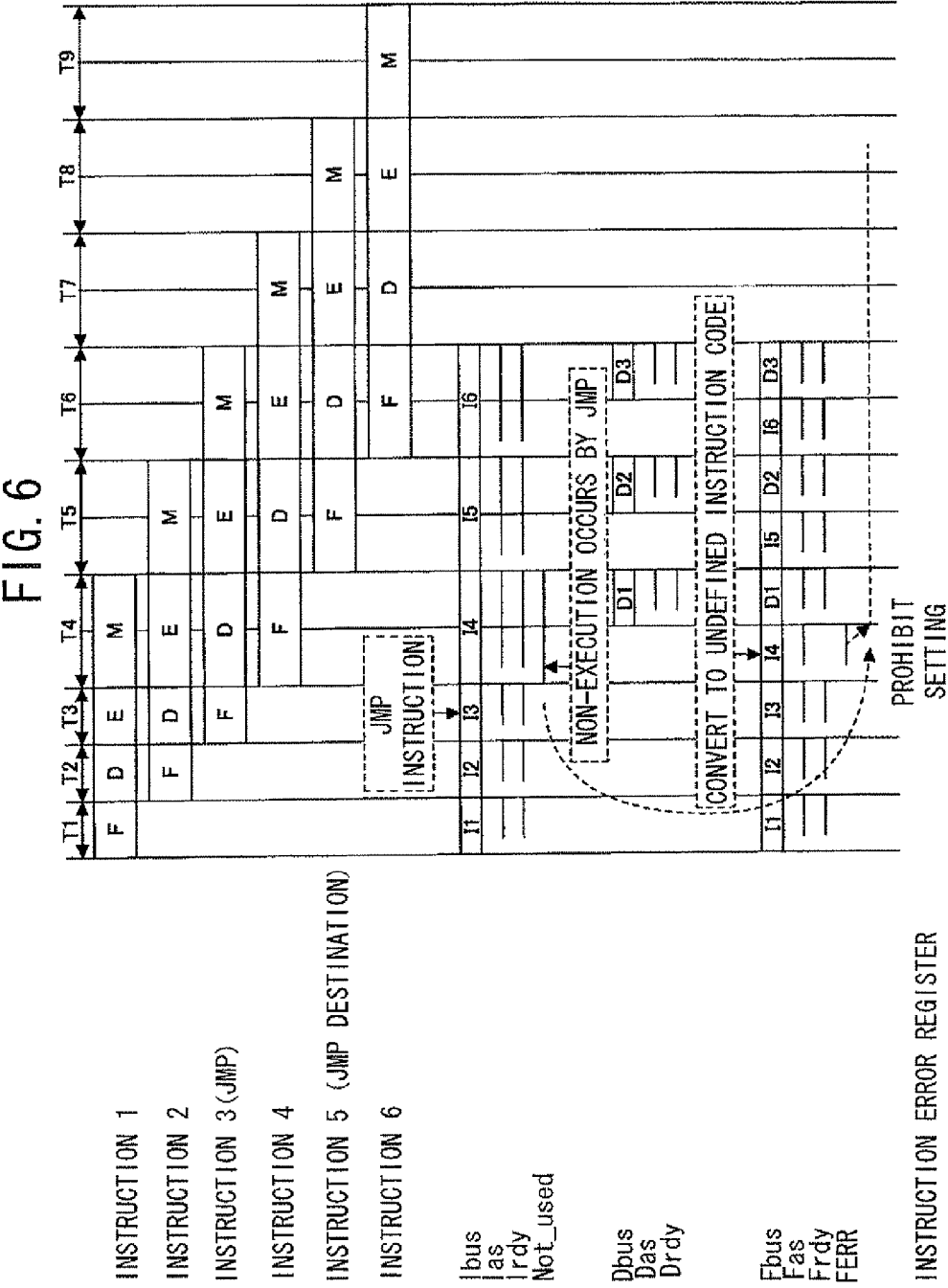

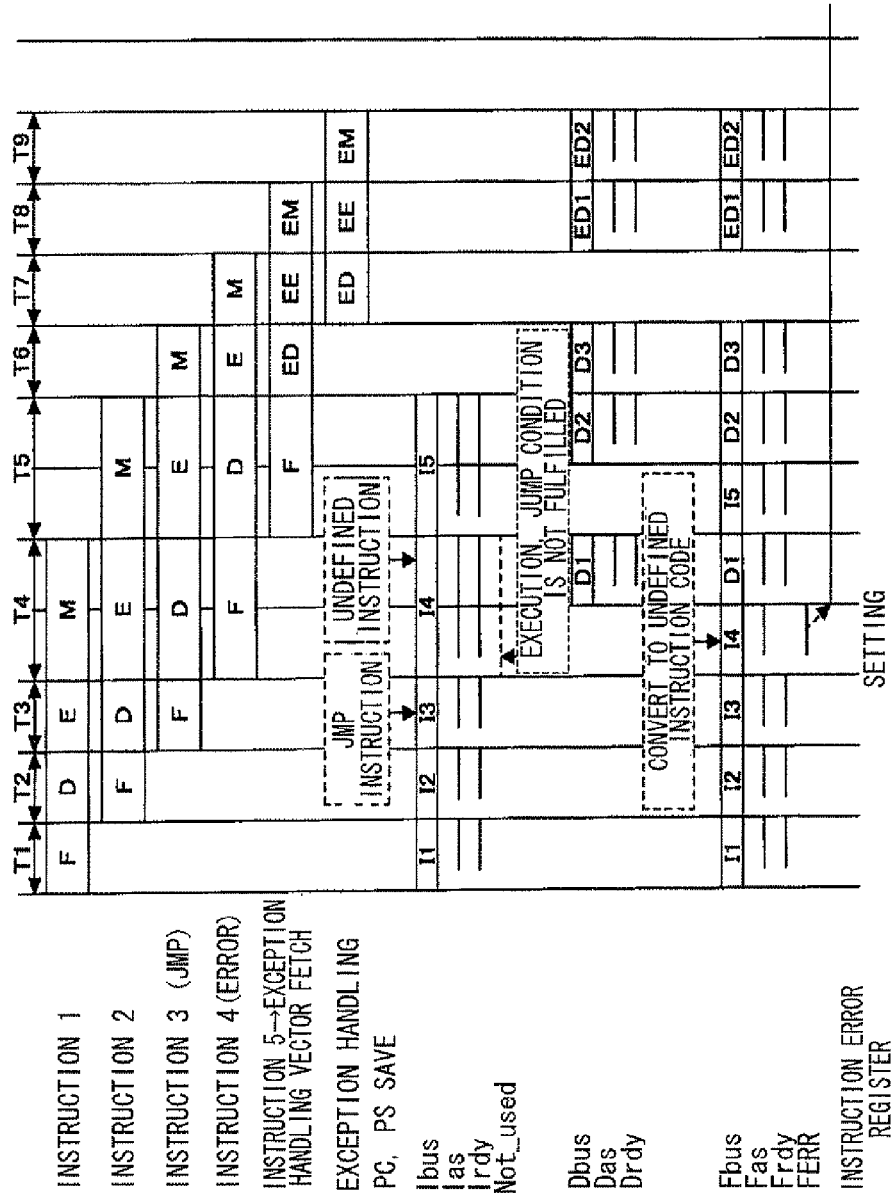

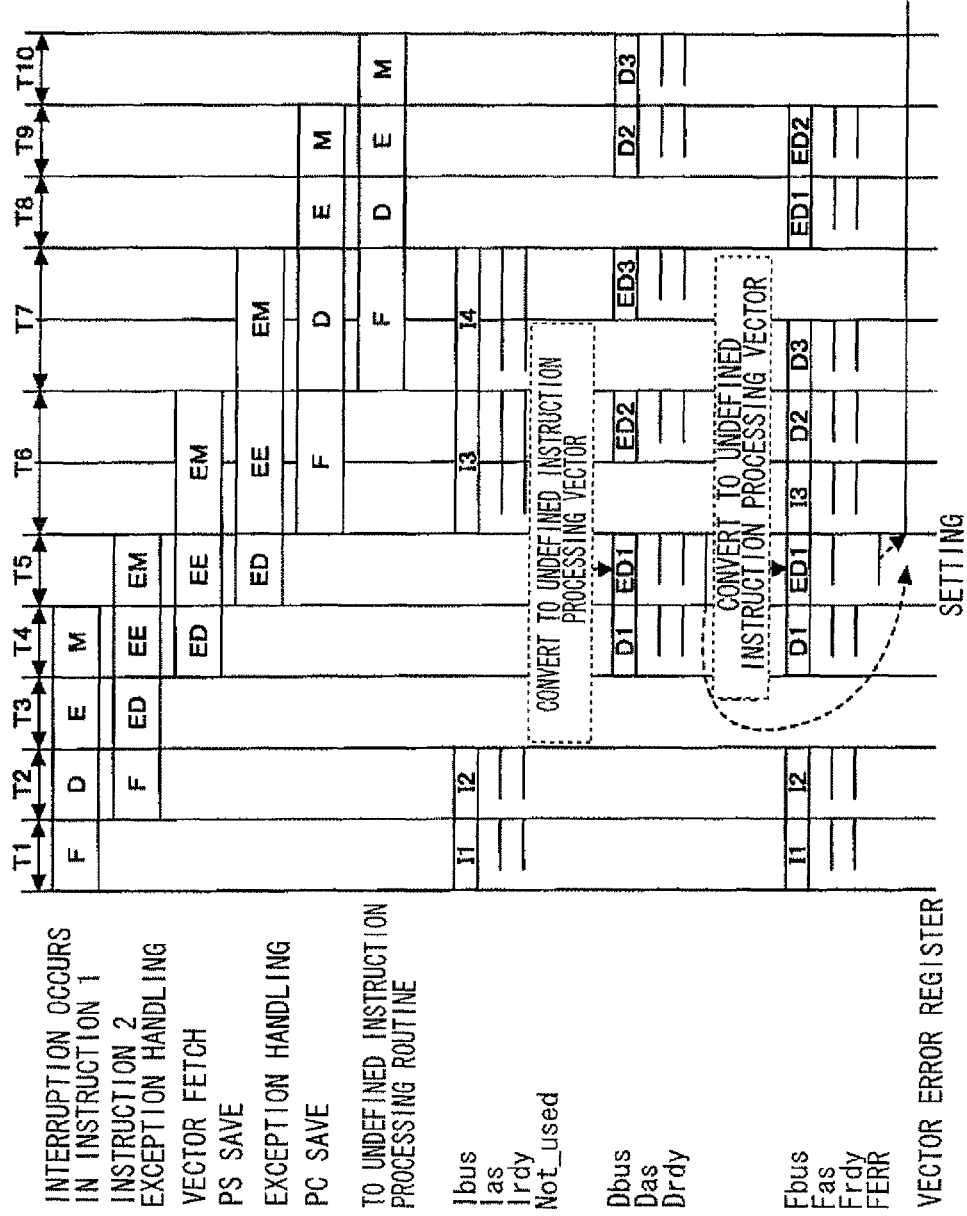

COMPUTER SYSTEM AND MEMORY SYSTEM

CROSS-REFERENCE TO RELATED APPLICATIONS

This application is based upon and claims the benefit of priority from the prior Japanese Patent Application NO. 2007-49458 filed on Feb. 28, 2007, the entire contents of which are incorporated herein by reference.

BACKGROUND OF THE INVENTION

1. Field of the Invention

The invention relates to a computer system and a memory system.

2. Description of the Related Art

A memory including an ECC check function or a parity check function is required for confirming safety in a microcomputer system which is, for example, used in a vehicle. Redundant bits for correcting errors are calculated from data to be written in an ECC memory (Error Check and Correct Memory) having a data correction function by ECC. The calculated redundant bits are stored in a memory core with the data to be written.

Whether there is an error in data (and the redundant bits) or not is detected by the read data and the redundant bits at the time of reading. Error correction is performed when there is an error. For example, error correction is possible when a 1-bit error occurs in the code if the error correction is realized by using a Hamming code. Error detection is possible when a 2-bit error occurs. A parity bit for error detection is calculated from data to be written in the ECC memory having the parity check function. The calculated parity bit is stored in the memory core with data to be written. Whether there is an error in data (and the parity bit) or not is detected by the read data and the parity bit at the time of reading.

There is a case in which an error occurs in the memory and the right instruction code cannot be supplied to a CPU core when the CPU fetches an instruction code from the memory. Such a case causes safety problems in in-vehicle systems and the like, if the CPU is halted to avoid executing the wrong instruction, by causing processing of the microcomputer system to be halted as well. Accordingly, as one method of avoiding the above situation, there is a method in which an external interruption is inputted to the CPU core in response to an error occurrence when the error occurs when accessing the instruction code.

However, in the configuration in which the external interruption is inputted in the CPU in response to the error occurrence, there is a fear that the instruction code in which the error occurred (erroneous instruction code outputted from the memory in which the error occurs and read by the CPU) will be executed before jumping into an interruption routine. In addition, the next instruction fetched by an instruction fetch unit is sometimes not used in a CPU having a pipeline configuration in which the respective operations of instruction fetch, instruction decoding, arithmetic execution, memory access and the like are redundantly executed. The next instruction fetched by an instruction fetch unit would not be used, for example, if an instruction decoding unit determines that a jump instruction decoded at present will jump. When the external interruption is performed in response to the error occurrence at the time of instruction fetch in such case, there is a fear that a pointless interruption will be generated because the error occurred with respect to the instruction which is not actually executed (an instruction following the jump instruction which will not be executed as the result of jump).

In JP-A-03-098129, a method in which an address of an access destination is always stored in a register at every access operation, and an address of the access destination when an error occurs is recorded as a register value by halting storing operation to the register at the point of error occurrence is disclosed.

In Jp-A-01-100636, a method in which, when a memory error or the like occurs at the time of reading, data which can be executed by the CPU is outputted on a bus instead of data having the error and the interruption is performed at the same time is disclosed.

SUMMARY OF THE INVENTION

According to one aspect of an embodiment, a computer system includes a CPU, a memory circuit storing at least instruction codes, an error checking circuit checking an error of an instruction code read from the memory circuit according to an instruction address supplied from the CPU, a code storing circuit storing data to be outputted to the CPU instead of data from the memory when an error occurs, a selection circuit in which inputs are coupled to the memory circuit and the code storing circuit, selectively outputting an instruction code read from the memory circuit when an error is not detected by the error checking circuit, and selectively outputting data from the code storing circuit when an error is detected by the error checking circuit, a bus connecting the selection circuit to the CPU, and an instruction error register storing a value indicating that an error occurs when the error is detected by the error checking circuit, and in which the CPU is configured to output a signal indicating that an instruction is not used when the instruction fetched through the bus is not used, and the instruction error register is set to a state of storing a value indicating that an error does not occur in response to the signal.

According to one aspect of an embodiment, a memory system includes a memory circuit storing instruction codes, an error checking circuit checking an error of an instruction code read from the memory circuit according to an instruction address supplied from an external bus, a code storing circuit storing data to be outputted to the CPU instead of data from the memory when an error occurs, a selection circuit in which inputs are coupled to the memory circuit and the code storing circuit, selectively outputting an instruction code read from the memory circuit to the external bus when an error is not detected by the error checking circuit, and selectively outputting data from the code storing circuit to the external bus when an error is detected by the error checking circuit, and an instruction error register storing a value indicating that an error occurs when the error is detected by the error checking circuit and is reset to a state of storing a value indicating that an error does not occur in response to signal input from the external bus to a terminal connected to the external bus.

The above-described embodiments of the present invention are intended as examples, and all embodiments of the present invention are not limited to including the features described above.

BRIEF DESCRIPTION OF THE DRAWINGS

FIG. 6 is a timing chart explaining operation in a case in which an instruction reading error occurred in the computer system shown in FIG. 5 but the instruction is not executed;

FIG. 7 is a timing chart explaining operation in a case in which an instruction read error occurred in the computer system shown in FIG. 5 and the instruction is executed; and FIG. 8 is a timing chart explaining operation in a case in which an instruction reading error occurred at the time of vector access operation in the computer system shown in FIG. 5.

DETAILED DESCRIPTION OF THE PREFERRED EMBODIMENTS

Figure 1:
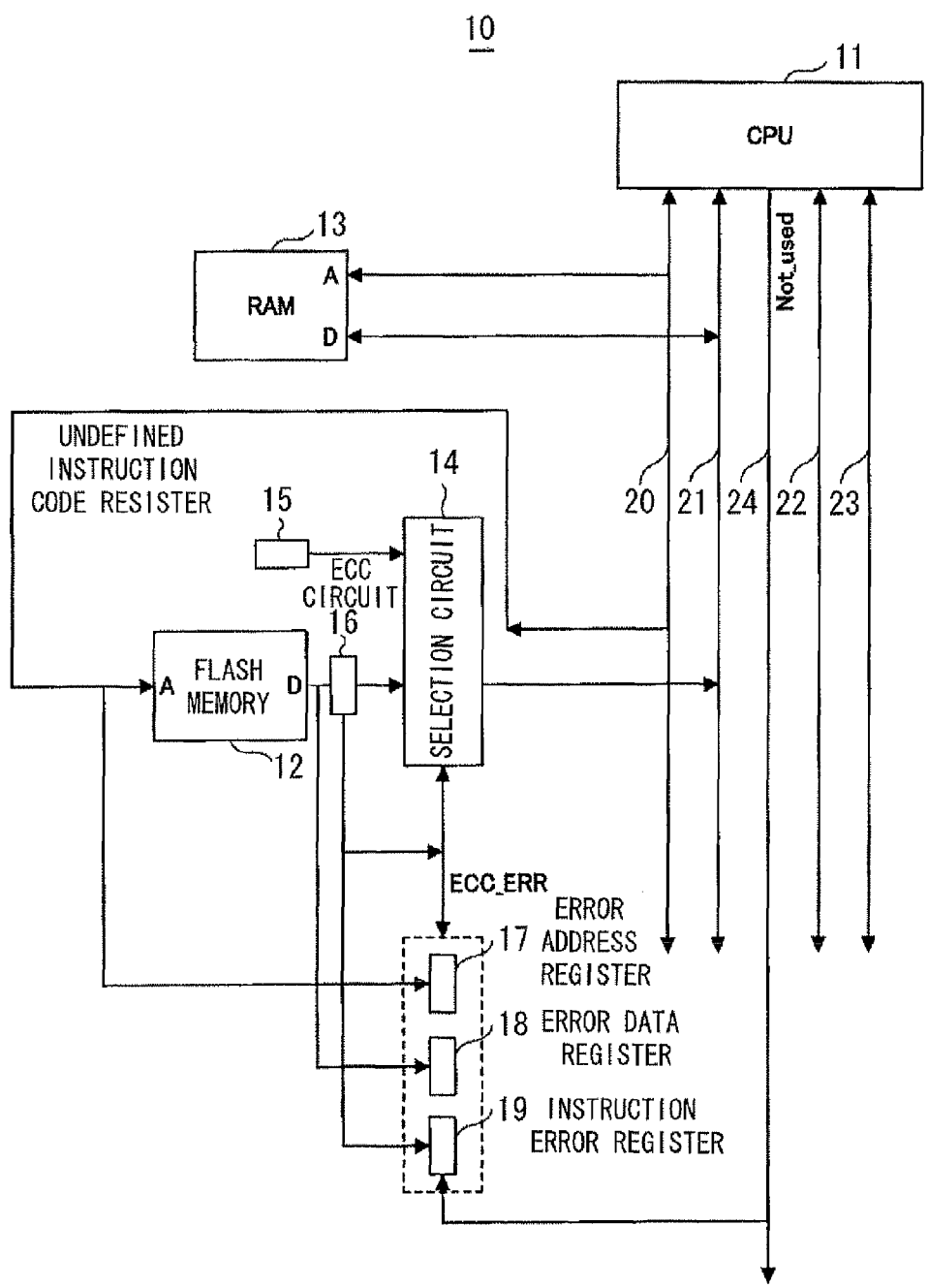
FIG. 1 is a diagram showing an example of a configuration of a first embodiment.

Reference may now be made in detail to embodiments of the present invention, examples of which are illustrated in the accompanying drawings, wherein like reference numerals refer to like elements throughout.

Hereinafter, embodiments will be explained in detail with reference to the attached drawings.

FIG. 1 is a diagram showing an example of a configuration of a first embodiment. A computer system 10 in FIG. 1 includes a CPU circuit 11, a flash memory 12, a RAM 13, a selection circuit 14, an undefined instruction code register 15, an ECC circuit 16, an error address register 17, an error data register 18, an instruction error register 19, an instruction address bus 20, an instruction data bus 21, a data address bus 22, data bus 23 and a control signal line 24. The instruction address bus 20, the instruction data bus 21, and an instruction control bus (not shown) make up an instruction bus. The data address bus 22, the data bus 23 and a data control bus (not shown) make up a data bus. The instruction address bus 20, the instruction data bus 21, the data address bus 22, the data bus 23 and the control signal line 24 are sometimes called as a bus generically.

The flash memory 12 is a nonvolatile semiconductor storage device, storing programs executed by the CPU circuit 11. That is, the flash memory 12 stores instruction codes of respective instructions included in a program executed by the CPU circuit 11 in order according to the configuration of the program. The present system will be explained, taking a configuration in which the CPU circuit 11 reads out instructions from the flash memory 12 as an example, and it is not necessary that a memory from which the CPU circuit 11 reads out instructions is nonvolatile but may be a volatile memory such as a DRAM.

The ECC circuit 16 is an error checking circuit which checks an error of an instruction code read from the flash memory 12 according to an instruction address supplied from the CPU circuit 11 through the instruction address bus 20. The ECC circuit 16 asserts an ECC_ERR signal when detecting an error. The ECC_ERR signal is supplied to the selection circuit 14 as well as supplied to a register group including the error address register 17, the error data register 18 and the instruction error register 19. In this example, the error checking circuit having a data correction/error detection function by ECC is assumed. It is also preferable to apply an error checking circuit based on the parity check and the like, and the error checking is not limited to a specific method.

The undefined instruction code register 15 is a storage circuit which stores undefined instruction codes. The undefined instruction code is explained as a code whereby the CPU executes exception handling accordingly when the undefined instruction code is decoded in the CPU circuit 11. In the exception handling, the CPU circuit 11 outputs a vector address, fetching a start address of an exception handler from vector addresses of the flash memory 12. The CPU circuit 11 starts the execution of the program from the start address of the exception handler, thereby executing a process when the undefined instruction occurs.

The selection circuit 14 in which inputs are coupled to the flash memory 12 (through the ECC circuit 16) and to the undefined instruction code register 15, selectively outputting the instruction code read from the flash memory 12 when an error is not detected by the ECC circuit 16, and selectively outputting the undefined instruction code from the undefined instruction code register 15 when an error is detected by the ECC circuit 16. That is, the selection circuit 14 selectively outputs the instruction code read from the flash memory 12 in response to a desassert state of the ECC_ERR signal from the ECC circuit 16 and selectively outputs the undefined instruction code from the undefined instruction code register 15 in response to an assert state of the ECC_ERR signal. The output of the selection circuit 14 is connected to the instruction data bus 21 and the instruction data bus 21 is connected to the CPU circuit 11.

The error address register 17 stores an address of the instruction address bus 20 at the time of error occurrence in the case that the error was detected by the ECC circuit 16. The error data register 18 stores read data from the flash memory 12 at the time of error occurrence in the case that an error was detected by the ECC circuit 16.

The instruction error register 19 stores a value indicating that an error occurred in the case that an error is detected. That is, the instruction error register 19 stores, for example, "1" as the value indicating that the error occurs in response to the assert state of the ECC_ERR signal. The CPU circuit 11 is configured to output (assert) a signal Not_Used indicating that the instruction is not used when the instruction fetched through the selection circuit 14 and the instruction data bus 21 is not used. The instruction error register 19 is set in a state of storing a value indicating that an error does not occur (for example "0") in response to the assertion of the signal Not_Used. For example, the signal Not_Used may be supplied from the CPU circuit 11 to a reset terminal of the instruction error register 19 through the control signal line 24. Similarly, the error address register 17 and the error data register 18 may be configured to reset to, for example, "0" in response to the assertion of the signal Not_Used.

The case in which the CPU circuit 11 outputs (asserts) the signal Not_Used as described above is, for example, a case in which an instruction fetched by the CPU circuit 11 is a jump instruction, and the decoded jump instruction is decided to jump. That is, the CPU circuit 11 has a pipeline structure in which respective operations such as instruction fetch, instruction decoding, arithmetic execution and memory access are executed redundantly, and when the instruction decoding unit determines that the jump instruction decoded at present will jump, the next instruction fetched in the instruction fetch unit is not used. In this case, the CPU circuit 11 outputs (asserts) the signal Not_used, thereby announcing that the instruction fetched at present or the instruction fetched last time will not be actually executed.

In the above configuration, when an error occurs in the read instruction code, it is possible to allow the CPU circuit 11 to fetch the undefined instruction code to be stored in the undefined instruction code register 15, thereby allowing the CPU circuit 11 to execute exception handling only when the CPU circuit 11 actually executes the undefined instruction code. Therefore, pointless interruption/exception handling can be prevented when an error occurs with respect to the instruction which will not be actually executed (the instruction next to the jump instruction and is not executed by the jump) such as a case in which external interruption is performed to the CPU circuit 11 in response to the error occurrence at the time of instruction fetch.

In addition, when an error occurs with respect to the instruction which will not be actually executed, the instruction error register 19 is set to a state of storing the value indicating that an error does not occur (for example "0") in response to the signal Not_used asserted by the CPU circuit 11. That is, when an error occurs with respect to the instruction not to be executed, the instruction error register 19 which has been once set to the state indicating that an error occurs is reset to be a state indicating that an error does not occur. According to the operation, when interruption processing to the CPU circuit 11 from the outside and exception handling in the CPU circuit 11 and the like occur due to some reason after that and various registers including the instruction error register 19 are checked, an instruction reading error which is actually not the factor of the exception handling (error occurred at the time of reading out the instruction which was not executed) is prevented to be misidentified as the factor of the exception handling executed at present.

When the CPU circuit 11 starts exception handling by executing the undefined instruction code from the undefined instruction code register 15, the CPU circuit 11 may check the instruction error register 19 in the exception processing. It is possible to decide that factor of the exception handling is the error detection by the ECC circuit 16 by checking the instruction error register 19. In addition, in the exception handling, the contents of the error address register 17 and the error data register 18 can be checked. Accordingly, it is possible to analyze the address and the data content when the error occurred.

Figure 2:
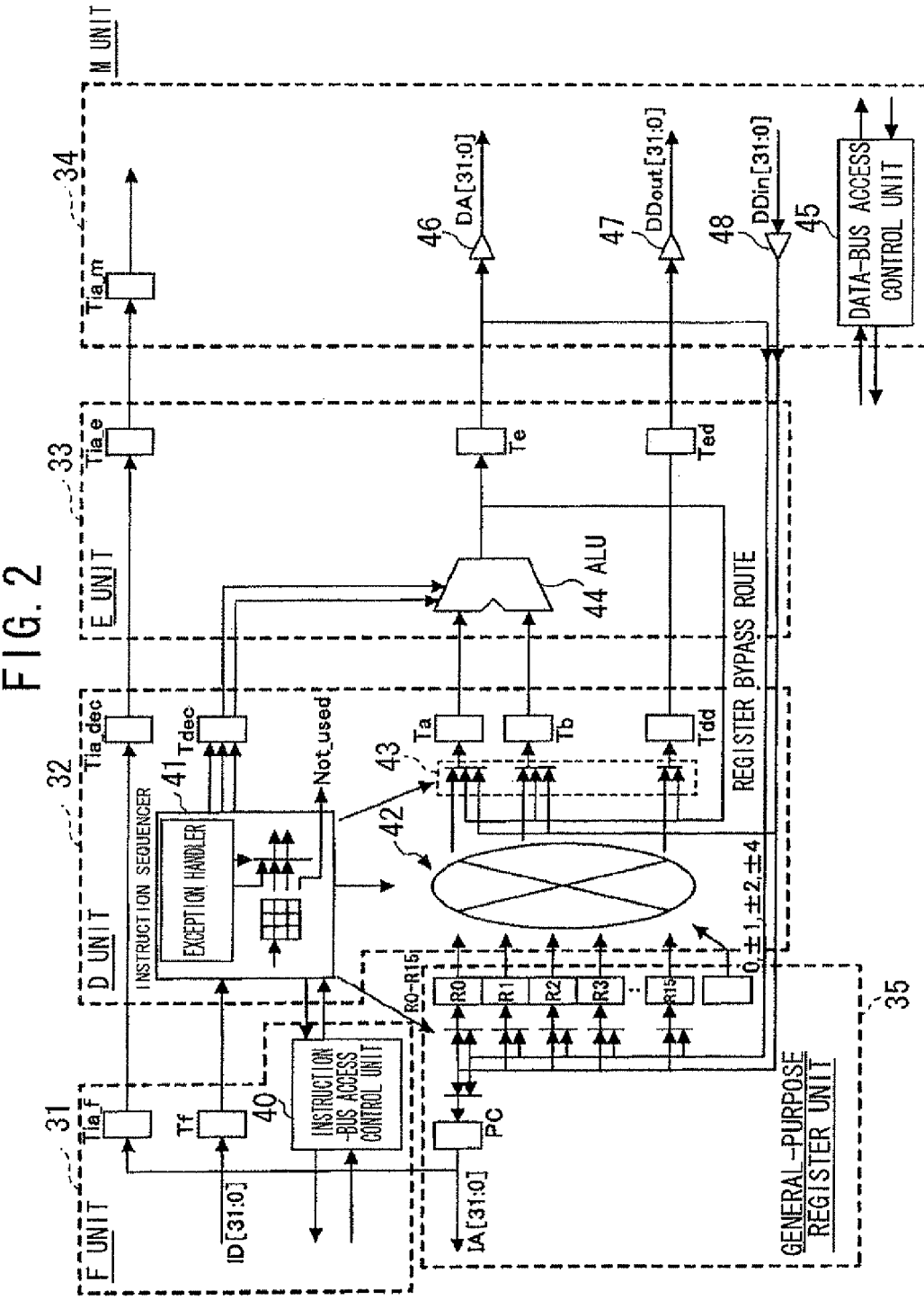
FIG. 2 is a diagram showing an example of a configuration of a CPU circuit.

FIG. 2 is a diagram showing an example of a configuration of the CPU circuit 11. The CPU circuit 11 shown in FIG. 2 includes a fetch unit (F unit) 31, a decoding unit (D unit) 32, an execution unit (E unit) 33, a memory access unit (M unit) 34 and a general-purpose register unit 35.

The general-purpose register unit 35 includes general-purpose registers R0 to R15 and a program counter PC. The program counter PC stores an instruction address IA [31:0] and outputs it to the instruction address bus 20 (refer to FIG. 1). Here, [31:0] indicates 0th bit to 31th bit in 32-bit wide data (address).

The fetch unit 31 includes an instruction-bus access control unit 40, an instruction resister Tf, an instruction address fetch register Tia_f. The decoding unit 32 includes an instruction sequencer 41, a switching circuit 42, a selection circuit 43, an instruction address decoding register Tia_dec, a decoding result register Tdec, arithmetic registers Ta, Tb and a data register Tdd. The execution unit 33 includes an arithmetic and logic unit (ALU) 44, an instruction address execution register Tia_e, an arithmetic result register Te and a data register Ted. The memory access unit 34 includes a data-bus access control unit 45, output buffers 46, 47, an input buffer 48 and an instruction address memory register Tia_m.

When the instruction address IA [31:0] is transmitted from the program counter PC to the instruction address bus 20, an instruction in accordance with that is fetched by the fetch unit 31, the instruction is decoded by the decoding unit 32, and corresponding calculation is executed by the execution unit 33. Lastly, memory access is executed by the memory access unit 34. Corresponding to respective operations, the instruction address IA [31:0] from the program counter PC is transmitted to and stored in the instruction address fetch register Tia_f, the instruction address decoding register Tia_dec, the instruction address execution register Tia_e and the instruction address memory register Tia_m in order.

First, in the fetch unit 31, an instruction code ID [31:0] read from the flash memory 12 (or the defined instruction code register 15) according to the instruction address transmitted from the program counter PC is stored in the instruction register Tf through the instruction data bus 21. At this time, the instruction-bus access control unit 40 operates under control of the instruction sequencer 41 to control instruction bus access operation. The instruction-bus access control unit 40, for example, outputs an instruction address strobe signal indicating that the instruction address is outputted on the instruction address bus 20 to the instruction bus or receives a ready signal indicating that the instruction access is available from the instruction bus.

In the decoding unit 32, the instruction sequencer 41 decodes the instruction code stored in the instruction register Tf, controlling the instruction sequence according to the result. That is, the instruction sequencer 41 executes various operations such as register operation, arithmetic and data transfer, which are designated according to the content of the instruction code stored in the instruction register Tf in the designated order, thereby realizing operation required by the instruction code. The operation is realized by the instruction sequencer 41 controlling operations of respective units of the CPU circuit 11.

For example, the instruction sequencer 41 writes the decoded result indicating an arithmetic mode according to the content of the instruction code stored in the instruction register Tf in the decode result register Tdec. Accordingly, the instruction sequencer 41 can control arithmetic operation of the arithmetic and logic unit 44. The instruction sequencer 41 controls the switching circuit 42 and the selection circuit 43 in accordance with the content of the instruction code stored in the instruction register Tf, thereby supplying a value to be stored in a desired register to the arithmetic and logic circuit 44 as an arithmetic target. Similarly, the content of the register designated according to the instruction code stored in the instruction register Tf can be outputted to the data bus 23 through the data register Tdd, the data register Ted and the output buffer 47.

The instruction sequencer 41 further executes an exception handling sequence for reading the start address of the exception handler by transmitting a vector address as described above when the instruction code is found to be an undefined instruction code as a result of decoding the instruction code stored in the instruction register Tf. The instruction sequencer 41 further transmits the signal Not_used indicating that an instruction code to be stored next in the instruction register Tf will not be executed when the instruction code is a JUMP instruction as a result of decoding the instruction code stored in the instruction register Tf. The control which will not execute decoding processing and the like of the next instruction code is executed in the CPU circuit 11 by the signal Not_used. In addition, the signal Not_used is transmitted to outside of the CPU circuit 11 as described above.

In the execution unit 33, the arithmetic and logic unit 44 executes arithmetic and logic operation in accordance with the arithmetic mode stored in the decoding result register Tdec. The arithmetic result is stored in the arithmetic result register Te. The arithmetic result stored in the arithmetic result register Te can be outputted to the data address bus 22 through the output buffer 46 in the memory access unit 34.

In the memory access unit 34; the data bus access control unit 45 operates under control of the instruction sequencer 41 of the decoding unit 32 to control data bus access operation. The data bus access control unit 45, for example, outputs an address strobe signal indicating that an address is outputted on the data address bus 22 to the data bus or receiving a ready signal indicating that the instruction access is available from the data bus. The input buffer 48 supplies data received from the data bus 23 to the general-purpose register unit 35.

Figure 3:
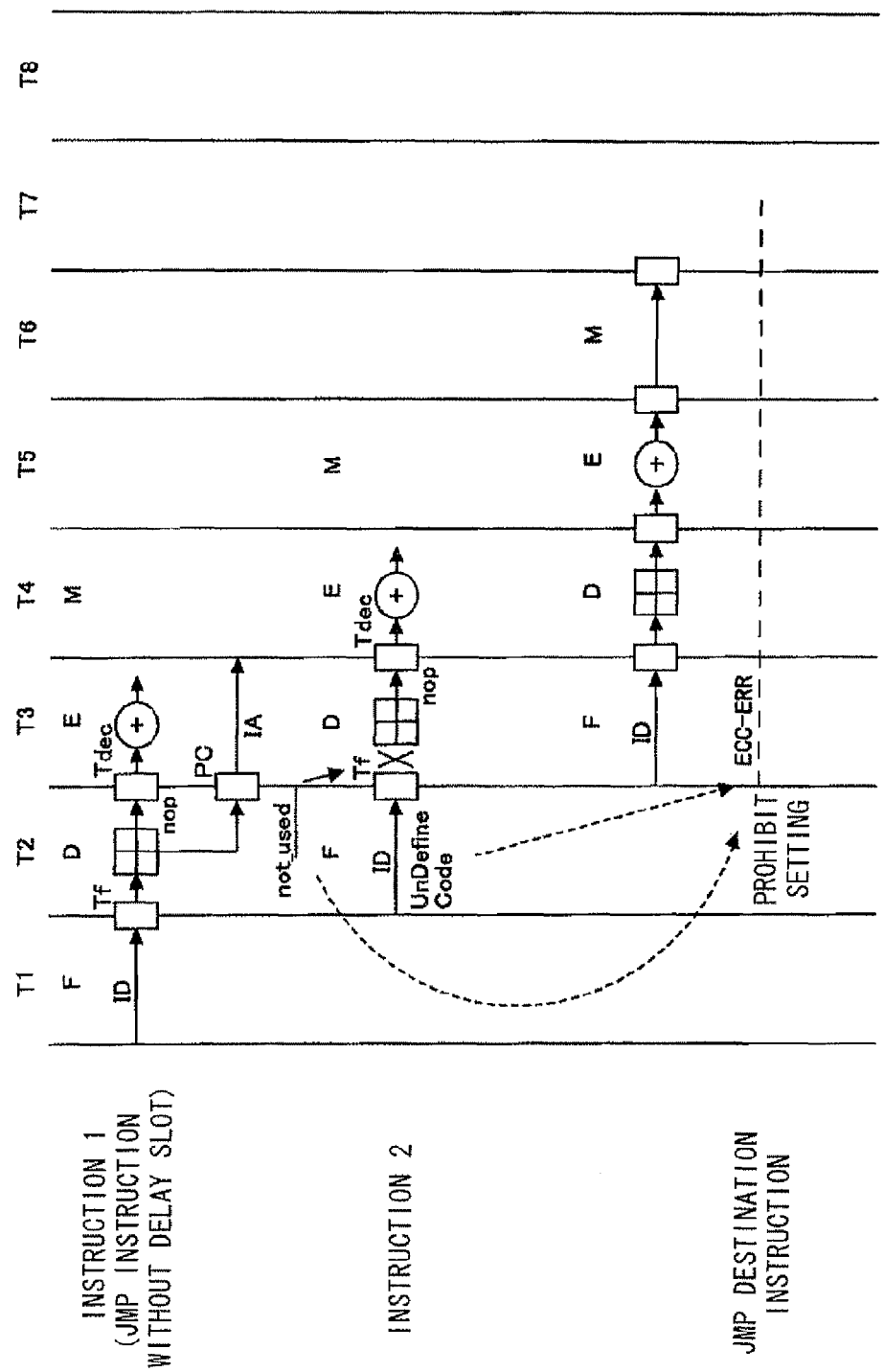
FIG. 3 is a timing chart explaining operation in a case in which an instruction reading error occurred in the computer system shown in FIG. 1 but the instruction is not executed.

FIG. 3 is a timing chart explaining operation in a case in which an instruction reading error occurred in the computer system 10 shown of FIG. 1 but the instruction is not executed. In FIG. 3, a state in which three instructions of an instruction 1, an instruction 2 and a JUMP destination instruction are redundantly executed in order by pipeline operation is shown. In the respective instructions, F D, E and M show operation in the fetch unit 31, operation in the decoding unit 32, operation in the execution unit 33 and the memory access unit 34, respectively. At the uppermost part of FIG. 3, timings of first to eighth operation cycles are shown as T1 to T8, respectively.

First, in the first operation cycle, the instruction 1 (a JUMP instruction without a delay slot) is fetched as an instruction code ID and stored in the instruction register Tf.

Next, in the second operation cycle, the content of the instruction register Tf is decoded (decoding operation is denoted by "D"). As it is the JUMP instruction, nop (no operation) is stored in the decoding result register Tdec as well as an address of JUMP destination in the program counter PC. At this time, a signal Not_used is generated.

In the second cycle, the instruction 2 is fetched as an instruction code ID and stored in the instruction register Tf. At this time, the ECC circuit 16 detects an error when reading the instruction 2 and an undefined instruction code is stored in the instruction register Tf.

Next, in the third operation cycle, arithmetic operation of the instruction 1 (arithmetic operation is denoted by "E") is executed, however, the content of the decoding result register Tdec is "nop", therefore, actual arithmetic is not executed. An instruction address IA which is the jump destination of the JUMP instruction as the instruction 1 is outputted from the program counter PC to the instruction bus 20.

Also in the third operation cycle, decoding operation of the instruction 2 which should have been executed is not executed, receiving that the signal Not_used have been generated. The fact that the decoding operation (denoted by "D") is not executed is shown by a sign "X" between the instruction register Tf and the decoding operation. As a result, exception handling based on the undefined instruction code is not executed and "nop" (no operation) is stored in the decoding result register Tdec.

Also in the third operation cycle, the JUMP destination instruction is fetched as an instruction code ID and stored in the instruction register Tf. ECC_ERR (refer to FIG. 1) is asserted by the error being detected by the ECC circuit 16 at the time of reading the instruction 2, however, the setting of error occurrence to the instruction error register 19 is prohibited by the assertion of the signal Not_used. If it has been already set, the setting of error occurrence is cancelled. The fact that the instruction error register 19 is not set in the state indicating the error occurrence is expressed by a dashed line shown below "ECC_ERR" in the drawing.

In operation cycles after that, the decoding "ID" as the JUMP destination instruction, the arithmetic "E" and the memory access operation "M" are sequentially executed. In parallel to this, an instruction next to the JUMP destination instruction, an instruction further next to the instruction and so on are redundantly executed in the pipeline configuration.

Figure 4:
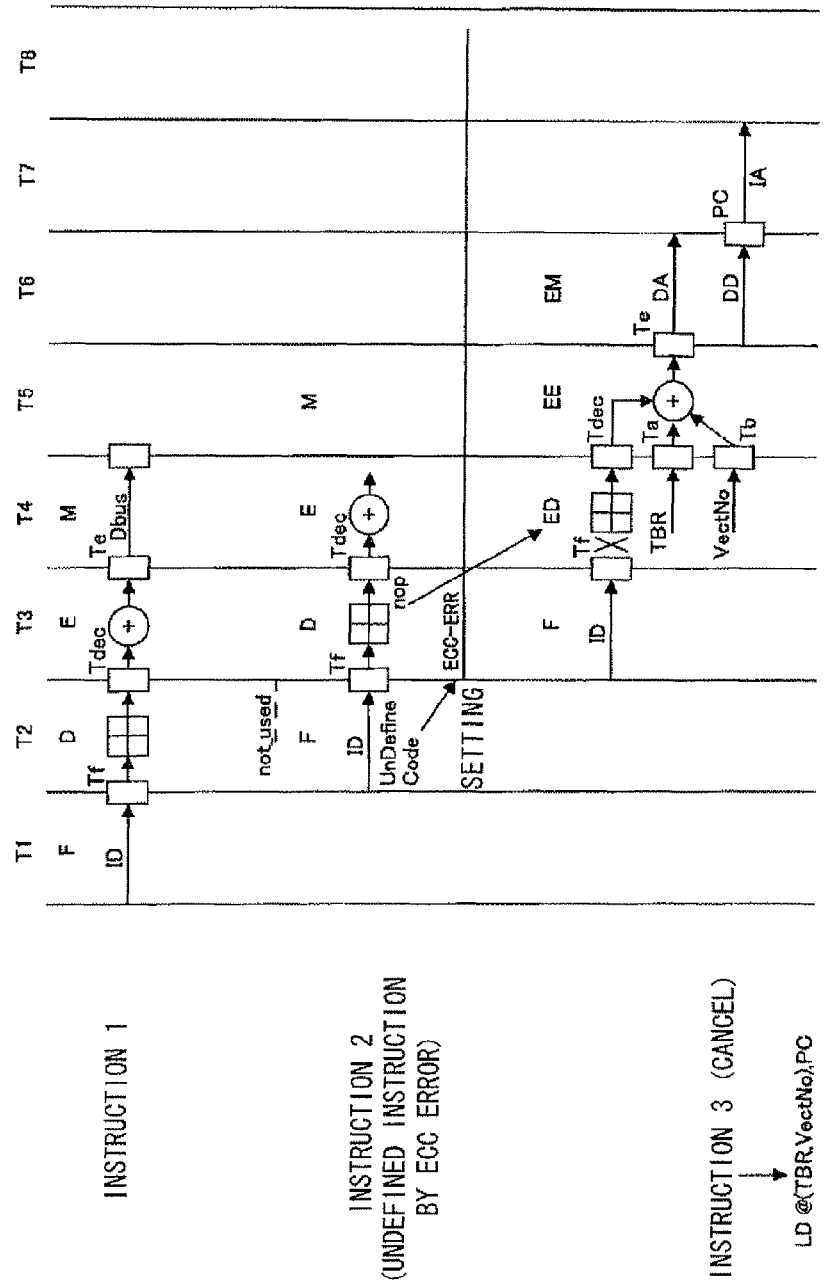
FIG. 4 is a timing chart explaining operation in a case in which an instruction reading error occurred in the computer system shown in FIG. 1 and the instruction is executed.

FIG. 4 is a timing chart explaining operation in a case in which an instruction reading error occurred in the computer system 10 shown in FIG. 1 and the instruction is executed. In FIG. 4, a state in which three instructions of an instruction 1, an instruction 2 and an instruction 3 are redundantly executed in order by pipeline operation is shown. In the respective instructions, F, D, E and M show operation in the fetch unit 31, operation in the decoding unit 32, operation in the execution unit 33 and operation of the memory access unit 34, respectively. At the uppermost part of FIG. 4, timings of first to eighth operation cycles are shown as T1 to T8.

First, in the first cycle, the instruction 1 is fetched as an instruction code ID and stored in the instruction register Tf.

Next, in the second operation cycle, the content of the instruction register Tf is decoded (decoding operation is denoted by "tb") and an arithmetic mode obtained as a result of decoding is stored in the recoding result register Tdec. At this time, the signal Not_used is not generated. The fact that the signal Not_used is not generated is expressed by a dashed line shown below "Not_used" in the drawing.

In the second cycle, the instruction 2 is fetched as an instruction code ID and stored in the instruction register Tf. At this time, the ECC circuit 16 detects an error when reading the instruction 2 and an undefined instruction code is stored in the instruction register Tf.

Next, in the third operation cycle, arithmetic operation of the instruction 1 (arithmetic operation is denoted by "E") is executed according to the content of the decoding result register Tdec. The arithmetic result is stored in the arithmetic result register Te.

Also in the third operation cycle, the content of the instruction register Tf with respect to the instruction 2 is decoded (decoding operation is denoted by "D"). The instruction 2 is an undefined instruction code read from the undefined instruction code register 15, therefore, exception processing is executed. As a result, "nop" (no operation) is stored in the decoding result register Tdec. Though ECC_ERR (refer to FIG. 1) is asserted by the error detected by the ECC circuit 16 at the time of reading out the instruction 2, the signal Not_used is not asserted, therefore, a state indicating that the error occurred is set in the instruction error register 19. The fact that the instruction error register 19 has been set in the state indicating the error occurrence is expressed by a solid line shown below "ECC_ERR" in the drawing.

Also in the third operation cycle, the instruction 3 is fetched as an instruction code ID and stored in the instruction register Tf.

Next, in the fourth operation cycle, memory access operation Dbus of the instruction 1 is executed with respect to the data bus. Though arithmetic operation (arithmetic operation is denoted by "E") is executed, the content of the decoding result register Tdec is "nop", therefore, actual arithmetic is not executed.

In the fourth operation cycle, decoding operation of the instruction 3 which should have been executed is not executed, receiving that the exception handling is activated. The fact that the decoding operation (denoted by "ED") of the instruction 3 is not executed is shown by a sign "X" between the instruction register Tf and the decoding operation. Instead of that, various setting operations according to the exception processing are performed. Specifically, an arithmetic mode instructing the adding is stored in the decoding result register Tdec, the content of a table base register TBR is stored in the arithmetic register Ta, and a vector number VectNo is stored in the arithmetic register Tb. The content of the table base register TBR is a first address of a vector table which is a table in which start addresses of plural different exception handlers are listed. The vector number VectNo is a number assigned according to the type of exception processing.

Next, in the fifth operation cycle, arithmetic operation (arithmetic operation is denoted by "EE") corresponding to the exception processing is executed. Accordingly, the result in which the vector number is added to the first address of the vector table is stored in the arithmetic result register Te.

Next, in the sixth operation cycle, memory access operation corresponding to exception processing is executed. That is, a value in which a vector number is added to the first address of the vector table is transmitted to the data address bus 22 as a data address DA. According to this, the value stored in the data address is read from the flash memory 12 and stored in the program counter PC as a data DD. For example, when a vector number #5 is assigned to the exception handling with respect to the undefined instruction code, a start address of the fifth exception handler counted from the head stored in the flash memory 12 is read, and the read start address is stored in the program counter PC. In the next seventh operation cycle, the start address is transmitted to the instruction address bus 20 from the program counter PC as an instruction address IA and program process of the exception handler is started.

Figure 5:
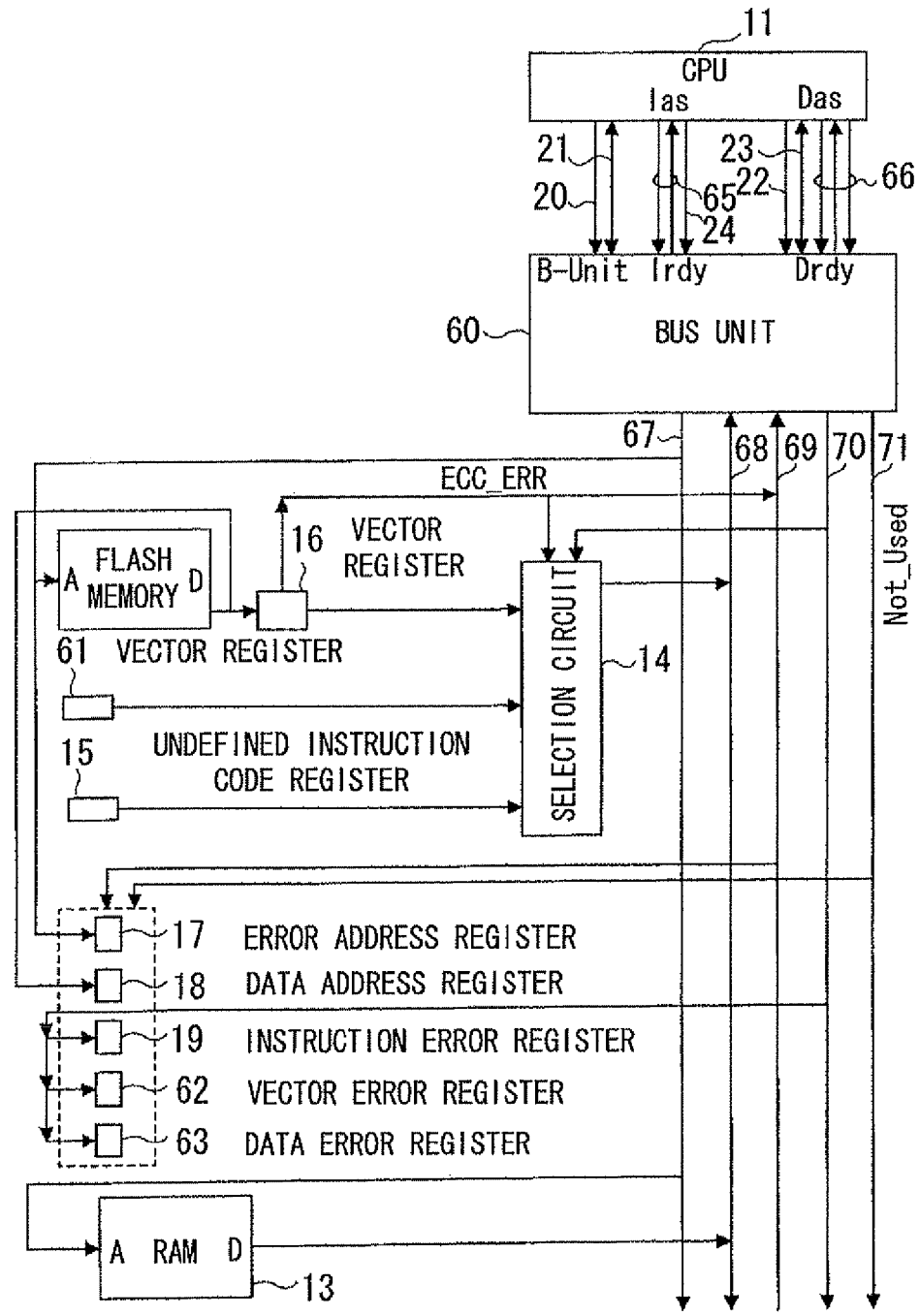
FIG. 5 is a diagram showing an example of a configuration of a second embodiment.

FIG. 5 is a diagram showing an example of a configuration of a second embodiment. In FIG. 5, components which are the same as FIG. 1 are referred to by the same numerals and explanation thereof will be suitably omitted.

A computer system 10A of FIG. 5 includes a CPU circuit 11, a flash memory 12, a RAM 13, a selection circuit 14, an undefined instruction code register 15, an ECC circuit 16, an error address register 17, and error data register 18, an instruction error register 19, an instruction address bus 20, an instruction data bus 21, a data address bus 22, a data bus 23, a control signal line 24, a bus unit 60, a vector register 61, a vector error register 62, a data error register 63, an instruction control bus 65, a data control bus 66, a common address bus 67, a common data bus 68, an error notification signal line 69, an access type control line 70 and a control signal line 71.

The instruction address bus 20, the instruction data bus 21 and the instruction control bus 65 make up an instruction bus, and the data address bus 22, the data bus 23 and the data control bus 66 make up a data bus. The common address bus 67, the common data bus 68 and the access type control line 70 make up a common bus. The signal of the instruction control bus 65 includes, for example, an address strobe signal Ias and a ready signal Irdy. The signal of the data control bus 66 includes, for example, a data strobe signal Das, a ready signal Drdy and a vector access signal Vect_ac. The vector access signal Vect_ac is asserted when the CPU circuit 11 performs vector access operation.

The bus unit 60 has a function of uniting the instruction bus and the data bus used by the CPU circuit 11 into one common bus. The bus unit 60 also transmits a signal Not_used received from the CPU circuit 11 through the control signal line 24 to the control signal line 71 as the signal Not_used as it is.

In the case that the CPU circuit 11 is executing instruction access operation by transmitting an instruction address to the instruction address bus 20, the bus unit 60 transmits a type specification signal indicating that the access operation is the instruction access operation to the access type control line 70. When the CPU circuit 11 is executing data access operation by transmitting a data address to the data address bus 22, the bus unit 60 transmits a type specification signal indicating that access operation is the data access operation to the access type control line 70. Further, when the CPU circuit 11 is executing vector access operation by transmitting a vector address to the data address bus 22 and asserting a vector access signal Vect_ac, the bus unit 60 transmits a type specification signal indicating that access operation is the vector access operation to the access type control line 70.

The ECC circuit 16 is an error checking circuit which checks an error of an instruction code read from the flash memory 12 according to an instruction address supplied from the bus unit 60 through the common address bus 67. The ECC circuit 16 asserts ECC_ERR signal when an error is detected. The ECC_ERR signal is supplied to the selection circuit 14 as well as transmitted to the error notification signal line 69. The ECC_ERR signal of the error notification signal line 69 is supplied to a register group including the error address register 17, the error data register 18, the instruction error register 19, a vector error register 62 and the data error register 63. In this example, the error checking circuit including data correction/error detection functions by ECC is assumed, however, it is also preferable to use an error checking circuit and the like based on the parity check, and the error checking is not limited to the specific method.

In the configuration of FIG. 5, the vector register 61 is provided in addition to the undefined instruction code register 15. The vector register 61 stores start addresses of exception handlers performing a process to be executed when an undefined instruction occurs. That is, the content of the vector register 61 may be the same as the start addresses of the exception handlers performing a process to be executed when an undefined instruction occurs, which are recorded in the vector table stored in the flash memory 12.

The selection circuit 14 in which inputs are coupled to the flash memory 12 (through the ECC circuit 16), to the undefined instruction code register 15 and to a data buffer 64, selectively outputting the instruction code read from the flash memory 12 when an error is not detected by the ECC circuit 16. The selection circuit 14 selectively outputs the undefined instruction code from the undefined instruction code register 15 when an error is detected by the ECC circuit 16 as well as the type specification signal indicates an instruction address output (instruction access operation). When the error is detected by the ECC circuit 16 as well as the type specification signal indicates a vector address output (vector access operation), the start address of the exception handler from the vector register 61 is selectively outputted. The output of the selection circuit 14 is connected to the common data bus 68, and connected to the CPU circuit 11 through the common data bus 68 and the instruction data bus 21.

The error address register 17 stores an address of the common address bus 67 at the time of error occurrence when an error is detected by the ECC circuit 16. The error data register 18 stores reading data from the flash memory 12 at the time of error occurrence when the error is detected by the ECC circuit 16. The instruction error register 19 stores a value indicating the error occurrence when the error is detected by the ECC circuit 16 as well as the type specification signal of the access type control line 70 indicates the instruction address output. The vector register 62 stores a value indicating the error occurrence when the error is detected by the ECC circuit 16 as well as the type specification signal of the access type control line 70 indicates the vector address output. The data error register 63 stores a value indicating the error occurrence when the error is detected by the ECC circuit 16 as well as the type specification signal of the access type control line 70 indicates the data address output. According to the assert state/deassert state of the ECC_ERR signal of the error notification signal line 69, presence/absence of error detection by the ECC circuit 16 is notified to respective registers.

The instruction error register 19 is set to a state of storing a value indicating that the error does not occur (for example, "0") in response to the assert of the signal Not_used of the signal control line 71. Similarly, the error address register 17 and the error data register 18 can be configured to be reset to, for example, "0" in response to the assert of the signal Not_used. It is also preferable that the external interruption is inputted to the CPU circuit 11 when the value indicating the error occurrence is stored in the data error register 63.

In the above configuration, when the error occurs in the ECC circuit 16 with respect to the start address of the exception handler read from the flash memory 12 according to the vector address, the start address of the exception handler stored in the vector register 61 can be fetched by the CPU circuit 11. Therefore, if the error occurs in memory reading in the vector address operation, it can be prevented that the content of the undefined instruction code register 15 is outputted again and that the program goes into an infinite loop.

FIG. 6 is a timing chart explaining operation in a case in which an instruction reading error occurred in a computer system 10A shown of FIG. 5 but the instruction is not executed. In FIG. 6, a state in which six instructions of an instruction 1, an instruction 2, an instruction 3 as a JUMP instruction, an instruction 4, an instruction 5 as a JUMP destination instruction and an instruction 6 are redundantly executed in order by pipeline operation is shown. In the respective instructions, F, D, E and M show operation in the fetch unit 31, operation in the decoding unit 32, operation in the execution unit 33 and operation of the memory access unit 34, respectively. At the uppermost part of FIG. 6, timings of first to ninth operation cycles are shown as T1 to T9, respectively.

In FIG. 6, Ibus denotes an address and data signal of the instruction bus, Ias denotes an instruction strobe signal, Irdy is a ready signal of the instruction, Not_used denotes the above-described signal Not_used, Dbus denotes an address and data signal of the data bus, Das denotes a data strobe signal, Drdy denotes a ready signal of data, Fbus denotes an address and data signal of the common bus, Fas denotes a common strobe signal, Frdy denotes a ready signal of the common bus access and FERR denotes a signal of the error notification signal line 69. In respective sections of Ias, Irdy, Not_used, Das, Drdy, Fas, Frdy, and FERR, solid lines mean that the signals are asserted.

In the first operation cycle, when the CPU circuit 11 executes instruction fetch operation by using the instruction bus, a signal 11 (an instruction address at first, and an instruction code after that) appears in the instruction bus between the CPU circuit 11 and the bus unit 60 as shown in Ibus of FIG. 6. At this time, the same signal 11 (an instruction address at first, and an instruction code after that) appears in the common bus between the bus unit 60 and the flash memory 12 as shown in Fbus of FIG. 6. Accordingly, the instruction fetch operation with respect to the instruction 1 is executed. Similarly, instruction fetch operation with respect to the instruction 2 is executed in the second operation cycle and instruction fetch operation with respect to the instruction 3 is executed in the third operation cycle.

The fourth operation cycle includes two operation cycles of the first half and the last half. In the first half of the fourth operation cycle, an instruction fetch operation 14 with respect to the fourth instruction is executed in the common bus (Fbus). In the last half of the fourth operation cycle, a memory access operation D1 with respect to the first instruction is executed in the common bus (Fbus). That is, the fourth instruction is fetched, then, the read-and-write operation of data due to the execution of the first instruction is executed with respect to the flash memory 12 or the RAM 13. As shown in Ibus, the instruction fetch operation 14 with respect to the fourth instruction is executed in the instruction bus between the CPU circuit 11 and the bus unit 60 by using the whole period of the fourth operation cycle. Also as shown in Dbus, the data access operation DI with respect to the first instruction is executed in the data bus between the CPU circuit 11 and the bus unit 60 by using the last half period of the fourth operation cycle.

In the fourth operation cycle, the signal Not_used is generated in response that the third operation was a JUMP instruction, which notifies that the fourth instruction will not be executed. As shown in FERR, an ECC error occurs in the reading of the fourth instruction, and a signal (ECC_ERR of FIG. 5) indicating the error occurrence is asserted to the error notification signal line 69. However, the setting of error occurrence to the instruction error register 19 is prohibited by the assertion of the Not_used (if it has already been set, the setting of error occurrence is canceled). The state in which the instruction error register 19 is not set to the state indicating the error occurrence is expressed by a dashed line in a section of "instruction error register" shown at the lowermost part of FIG. 6.

The fifth operation cycle includes two operation cycles of the first half and the last half. In the first half in the fifth operation cycle, an instruction fetch operation 15 with respect to the fifth instruction (JUMP destination instruction) is executed in the common bus (Fbus). In the last half of the fifth operation cycle, a memory access operation D2 with respect to the second instruction is executed in the common bus (Fbus). That is, the fifth instruction is fetched, then, read-and-write operation of data due to the execution of the second instruction is executed with respect to the flash memory 12 or the RAM 13. As shown in Ibus, the instruction fetch operation 15 with respect to the fifth instruction is executed in the instruction bus between the CPU circuit 11 and the bus unit 60 by using the whole period of the fifth operation cycle. As shown in Dbus, a data access operation D2 with respect to the second instruction is executed in the data bus between the CPU circuit 11 and the bus unit 60 by using the last half period of the fifth operation cycle. The sixth operation cycle is the same as the above.

FIG. 7 is a timing chart explaining operation in a case in which an instruction reading error occurred in a computer system 10A shown of FIG. 5 and the instruction is executed. In FIG. 7, a state in which an instruction 1, an instruction 2, an instruction 3 as a JUMP instruction, an instruction 4, an instruction 5 and an exception handling are redundantly executed in order by pipeline operation is shown. In FIG. 7, components which are the same as FIG. 6 have the same operation contents, therefore, explanation thereof will be appropriately omitted.

The operation of FIG. 7 is different from the operation of FIG. 6 in a point that the instruction 3 as the JUMP instruction does not jump because jump conditions are not fulfilled. In this case, the signal Not_used is not asserted. The state in which the signal Not_used is not asserted is expressed by a dashed line shown in the section "Not_used".

In the same way as the case of FIG. 6, an ECC error occurs in the reading of the fourth instruction as shown in FERR and a signal (ECC_ERR of FIG. 5) indicating the error occurrence is asserted to the error notification signal line 69. In the FIG. 7, the signal Not_used is not asserted, therefore, the error occurrence is set to the instruction error register 19 (the setting of error occurrence is not cancelled). The state in which the instruction error register 19 is set in the state indicating the error occurrence is expressed by a solid line in the section "instruction error register" shown in the lowermost part of FIG. 6.

According to the ECC error occurrence in the reading of the fourth instruction, an undefined instruction code stored in the undefined instruction code register 15 as the fourth instruction is fetched and executed. Therefore, in the same way as described in FIG. 3, an exception handling is executed instead in the timing of decoding operation of the instruction 5 as the next instruction. In the exception handling, a vector fetch is executed in the sixth to eight operation cycles as well as save of a program counter PC and a processor status register PS is executed. In FIG. 7, ED, EE and EM in sections corresponding to the exception handling denote decoding (D), arithmetic (E) and memory access (M) of the exception handling (Exception).

FIG. 8 is a timing chart explaining operation in a case in which a reading error occurred at the time of vector address operation in the computer system 10A of FIG. 5. In FIG. 8, a state in which an instruction 1, an instruction 2, an exception handling after that, and further, an undefined instruction process routine (a program of an exception handler) are redundantly executed in order by pipeline operation is shown. The notation of signals and the like are the same as FIG. 6 and FIG. 7. At the uppermost part of FIG. 8, timings of first to tenth operation cycles are shown as T1 to T10, respectively.

First, instruction fetch operation with respect to the instruction 1 is executed in the first operation cycle, and instruction fetch operation with respect to the instruction 2 is executed in the second operation cycle. An exception occurs in decoding operation of the instruction 1 in the second operation cycle, and the exception handling is executed from the third operation cycle. That is, the vector fetch, the save of the PS (processor status register) and the save of the PC (program counter) are respectively executed. ED, EE and EM corresponding to sections corresponding the exception handling denote the decoding (D), the arithmetic (E) and the memory access (M) of the exception handling (Exception).

In the exception handling, vector access operation is executed as the memory access operation EM in the fifth operation cycle. As shown in Dbus of FIG. 8, a signal ED1 (a vector address at first, and an exception handler start address after that) appears in the data bus between the CPU circuit 11 and the bus unit 60. At this time, the same signal ED1 (a vector address at first, and an exception handler start address after that) appears in the common bus between the bus unit 60 and the flash memory 12 as shown in Fbus of FIG. 8. Accordingly, the vector access operation is executed.

At this time, as shown in FERR as a solid line, an ECC error occurs in the reading of the content of the vector table, and a signal (ECC_ERR of FIG. 5) indicating the error occurrence is asserted to the error notification signal line 69. According to this, the error occurrence is set in the vector error register 62. The state in which the vector error register 62 is set to the state indicating the error occurrence is expressed by a solid line in the section "vector error register" shown in the lowermost part of FIG. 8.

According to the ECC error occurrence in the reading at the time of vector access operation, an undefined instruction process vector (a start address of and exception handler performing a process to be executed when an undefined instruction occurs) to be stored in the vector register 61 is fetched. Therefore, the exception handler performing a process to be executed when the undefined instruction occurs can be executed without problems regardless of occurrence of the ECC error in the reading at the time of vector access operation.

After that, the undefined instruction process vector read in the fifth operation cycle is set in the program counter PC to execute an undefined instruction process routine (a program of the exception handler). As shown in FIG. 8, the first instruction of the undefined instruction process routine is executed in the sixth to ninth operation cycles, and the second instruction is executed in the seventh to tenth operation cycles.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer system, comprising:
a CPU;
a memory circuit storing at least instruction codes;
an error checking circuit checking an error of an instruction code read from the memory circuit according to an instruction address supplied from the CPU;
a code storing circuit storing data, which makes the CPU execute an exception handling, to be outputted to the CPU instead of data from the memory when an error occurs;
a selection circuit in which inputs are coupled to the memory circuit and the code storing circuit, selectively outputting an instruction code read from the memory circuit when an error is not detected by the error checking circuit, and selectively outputting data from the code storing circuit to execute the exception handling when an error is detected by the error checking circuit;
a bus connecting the selection circuit to the CPU; and
an instruction error register storing a value indicating that an error occurs when the error is detected by the error checking circuit, and
wherein the CPU is configured to output a signal indicating that an instruction is not executed when the instruction fetched through the bus is not executed, to execute the exception handling when the instruction fetched through the bus is the data and the signal indicating that the instruction is not executed is not output and not to decode the instruction in a decode cycle based on the signal when the instruction fetched through the bus is the data and the signal indicating that the instruction is not executed is output, and
the instruction error register is set to a state of storing a value indicating that an error does not occur in response to the signal indicating that the instruction is not executed.

2. The computer system according to claim 1, wherein the code storing circuit stores a code which causes an undefined instruction exception.

3. The computer system according to claim 1, wherein the signal is supplied to a reset terminal of the instruction error register from the CPU through a signal line.

4. The computer system according to claim 1, wherein a previous instruction which is fetched prior to the instruction by the CPU is a JUMP instruction and a decoded JUMP instruction is determined to jump.

5. The computer system according to claim 1, wherein the CPU does not execute the exception handling when the instruction fetched through the bus is the data and the signal indicating that the instruction is not executed is output.

6. The computer system according to claim 1, wherein the CPU outputs a vector address in the exception handling and fetches a start address of an exception hander from vector addresses of the memory circuit.

7. The computer system according to claim 6, wherein the CPU outputs a type specification signal indicating which of the instruction address and the vector address is outputted.

8. The computer system according to claim 7, further comprising:
a vector error register, and
wherein the instruction error register is configured to store a value indicating that an error occurs in the case that the error is detected by the error checking circuit as well as the type specification signal indicates an instruction address output, and the vector error register is configured to store a value indicating that an error occurs in the case that the error is detected by the error checking circuit as well as the type specification signal indicates a vector address output.

9. A memory system, comprising:
a memory circuit storing instruction codes;
an error checking circuit checking an error of an instruction code read from the memory circuit according to an instruction address supplied from an external bus;
a code storing circuit storing data, which makes the CPU execute an exception handling, to be outputted to a CPU instead of data from the memory when an error occurs;
a selection circuit in which inputs are coupled to the memory circuit and the code storing circuit, selectively outputting an instruction code read from the memory circuit to the external bus when an error is not detected by the error checking circuit, and selectively outputting data to execute the exception handling from the code storing circuit to the external bus when an error is detected by the error checking circuit; and
an instruction error register storing a value indicating that an error occurs when the error is detected by the error checking circuit and is reset to a state of storing a value indicating that an error does not occur in response to a signal indicating that an instruction is not executed which is input from the external bus to a terminal connected to the external bus,
wherein the exception handling is executed when the instruction fetched through the bus is the data and the signal indicating that the instruction is not executed is not output and the instruction is not decoded in a decode cycle based on the signal when the instruction fetched through the bus is the data and the signal indicating that the instruction is not executed is output.

10. The memory system according to claim 9, further comprising:
a vector storing circuit storing start addresses of exception handlers performing a process to be executed when an undefined instruction occurs, and wherein the selection circuit in which inputs are coupled to the memory circuit, the code storing circuit and the vector storing circuit, selectively outputting the data from the code storing circuit to the external bus when an error is detected by the error checking circuit as well as a type specification signal from the external bus indicates an instruction address supply, and selectively outputting a start address of the exception handler from the vector storing circuit to the external bus when an error is detected by the error checking circuit as well as the type specification signal from the external bus indicates a vector address supply.

11. A computer method, comprising:
storing a plurality of instruction codes in a memory circuit;
reading one of the instruction codes from the memory circuit according to an instruction address supplied from a CPU;
checking the instruction code for an error;
storing substitute data, which makes the CPU execute an exception handling, to be outputted to the CPU instead of data from the memory when an error occurs;
selectively outputting an instruction code read from the memory circuit if an error is not detected;
selectively outputting the substitute data to execute the exception handling if an error is detected;
storing a value indicating that an error occurred if the error is detected, and
outputting a signal indicating that an instruction was not executed when the instruction was not executed;
executing the exception handling when the instruction fetched through the bus is the data and the signal indicating that the instruction is not executed is not output;
not decoding the instruction in a decode cycle based on the signal when the instruction fetched through the bus is the data and the signal indicating that the instruction is not executed is output; and
storing a value indicating that an error did not occur in an instruction error register in response to the signal indicating that the instruction was not executed.

* * * * *

UNITED STATES PATENT AND TRADEMARK OFFICE
CERTIFICATE OF CORRECTION

| | | |
|---|---|---|
| PATENT NO. | : 8,423,834 B2 | |
| APPLICATION NO. | : 12/036634 | |
| DATED | : April 16, 2013 | |
| INVENTOR(S) | : Isao Sasazaki | |

It is certified that error appears in the above-identified patent and that said Letters Patent is hereby corrected as shown below:

In the Claims:

Column 15, Line 1, In Claim 6, delete "hander" and insert -- handler --, therefor.

Signed and Sealed this
Thirteenth Day of August, 2013

Teresa Stanek Rea
*Acting Director of the United States Patent and Trademark Office*